United States Patent [19]

Bothe et al.

[11] Patent Number: 4,975,329
[45] Date of Patent: Dec. 4, 1990

[54] COEXTRUDED, BIAXIALLY ORIENTED MULTILAYER FILM

[75] Inventors: Lothar Bothe, Mainz-Gonsenheim; Guenther Crass, Taunusstein; Gunter Schloegl, Kelkheim; Thomas Wilheim, Taunusstein, all of Fed. Rep. of Germany

[73] Assignee: Hoechst Aktiengesellschaft, Frankfurt am Main, Fed. Rep. of Germany

[21] Appl. No.: 274,334

[22] Filed: Nov. 21, 1988

[30] Foreign Application Priority Data

Nov. 28, 1987 [DE] Fed. Rep. of Germany ....... 3740449

[51] Int. Cl.$^5$ .............................................. B32B 15/08
[52] U.S. Cl. .................................... 428/461; 428/516; 428/910; 361/313; 361/319; 361/323
[58] Field of Search ........................ 428/910, 516, 461; 361/319, 313, 323

[56] References Cited

U.S. PATENT DOCUMENTS 4,283,453  8/1981  Siefried et al. ........................ 428/212
4,692,837  9/1987  Crass et al. ........................... 361/313

FOREIGN PATENT DOCUMENTS 0008623  3/1980  European Pat. Off. .

OTHER PUBLICATIONS

Henman (Ed.), "World Index of Polyolefine Stabilizers," Royal Society of Chemistry, 1982, pp. 12, 202–243.

Primary Examiner—Edith Buffalow
Attorney, Agent, or Firm—Foley, Lardner, Schwartz, Jeffery, Schwaab, Mack, Blumenthal & Evans

[57] ABSTRACT

A coextruded, biaxailly oriented multilayer film comprises a base layer comprising an extremely pure raw material and outer layer. It is suitable for use as an electrically insulating film, as a dielectric in an electrical capacitor, and has improved dielectrical properties for this purpose. The base layer and the outer layer or layers contain propylene polymer on one or both sides and stabilizers for propylene polymers. The raw material for the base layer has an idealized thermal oxidation temperature in the range of 260° to 300° C., preferably in the range 260° to 280° C., and the raw material for the outer layer or layers has an idealized thermal oxidation temperature in the region of 240° to 300° C., preferably in the range 240° to 270° C. The multilayer film as a whole has an idealized thermal oxidation temperature in the range 250° to 290° C., in paticular in the range 250° to 275° C. The content of organic neutralizing agents, in particular calcium stearate, in the raw materials is less than or equal to 100 ppm.

26 Claims, 1 Drawing Sheet

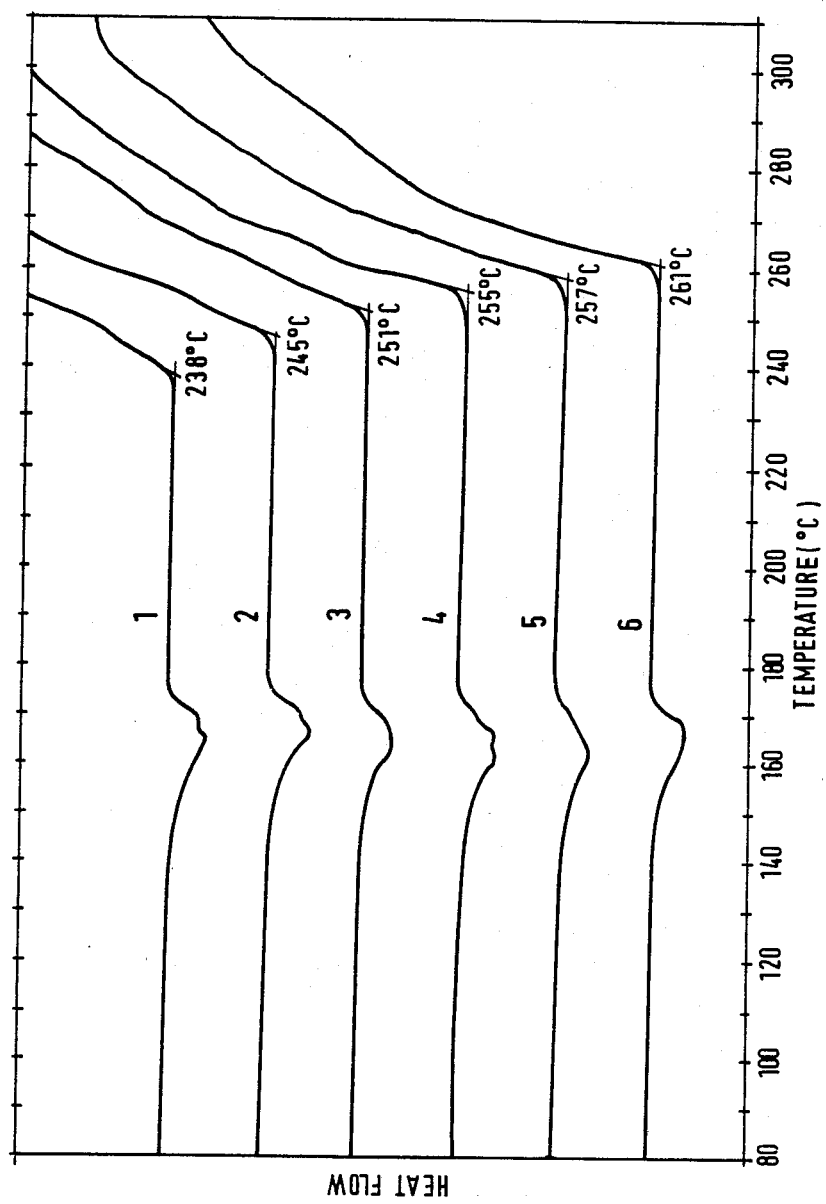

COEXTRUDED, BIAXIALLY ORIENTED MULTILAYER FILM

BACKGROUND OF THE INVENTION

The present invention relates to a coextruded, biaxially oriented multilayer film suitable for use as an electrically insulating film. The multilayer film is particularly useful as a dielectric for the production of electrical film capacitors.

The use of plastic films as electrical insulation materials has been known for a long time. These films are used not only as dielectrics in capacitors but also for cable insulation or as self-adhesive insulating tapes. The electrical properties of films of this type must satisfy very onerous requirements. Not only must the dielectric loss factor be low and the breakdown voltage be high but these characteristic values must be retained over a long period of time, especially at elevated temperatures.

A number of publications deals with biaxially oriented polypropylene films, which are said to have a particularly high breakdown voltage. A good breakdown voltage is mostly obtained by using polypropylene raw materials which have quite specific properties.

Thus, EP-A-0,011,796 describes the use of a biaxially oriented polypropylene film as electrically insulating film which has two layers and is used in metallized form for producing capacitors. The raw material for this electrically insulating film is extremely pure polypropylene which has a residual ash content of less than 100 ppm, is free from organic or inorganic lubricant additives and contains no ionogenic components.

EP-A-0,222,296 discloses a coextruded, biaxially oriented multilayer film in which the base layer likewise comprises extremely pure raw material for electrical films, based on polypropylene polymers. In order to improve the electrical properties of the film when used as a dielectric in capacitors, the stabilizer content of the outer layer or layers is significantly higher than the stabilizer content of the base layer. In connection with electrically insulating plastic films, stabilizers are understood to mean specific compounds which reduce the occurrence of oxidation and thus the time dependence of the dielectric loss factor and electrical breakdown voltage, when these films are used in capacitors as dielectrics in combination with thin layers of metal acting as electrodes.

SUMMARY OF THE INVENTION

Accordingly, it is an object of the present invention to provide a multilayer film, capable of use as an electrically insulating film, with a low dielectric loss factor, high breakdown potential and improved long term behavior.

Another object of the present invention is to provide an electrically insulating film which can be produced by known methods without process modifications.

A further object of the present invention is to provide an electrically insulating film capable of use as a dielectric in a capacitor, including a film foil capacitor and an MKP-capacitor (metalized polypropylene film capacitor).

Still another object of the invention is to provide an improved capacitor made from the multilayer film according to the invention.

In accomplishing the foregoing objects, there has been provided, in accordance with one aspect of the present invention, a coextruded, biaxially oriented multilayer film comprising (a) a base layer comprising an extremely pure raw material which comprises at least one propylene polymer and at least one stabilizer for propylene polymers, and (b) an outer layer on at least one side of said base layer, said outer layer comprising a raw material which comprises at least one propylene polymer and at least one stabilizer for a propylene polymer, wherein said base layer raw material has an idealized thermal oxidation temperature of between 260 and 300° C, said outer layer raw material has an idealized thermal oxidation temperature of between 240 and 300° C., and said multilayer film as a whole has an idealized thermal oxidation temperature of between 250 and 290° C., and wherein said raw materials further comprise from 0 to about 100 ppm of at least one organic neutralizing agent.

In accordance with another aspect of the present invention, there has been provided an electrically insulating film comprising said multilayer film.

In accordance with yet another aspect of the present invention, there has been provided a dielectric material comprising said electrically insulating film and a layer of metal deposited on one side of said film.

According to still another aspect of the invention, there has been provided a capacitor comprising two metallic electrode layers separated by a multilayer insulating film as defined above.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURE

The invention may be more readily understood by referring to the accompanying figure. The figure plots the change in heat flow with temperature for samples 1–6 of Table I, by means of which plot the idealized thermal oxidation temperatures of the samples were determined.

DETAILED DESCRIPTION OF PREFERRED EMBODIMENTS

The base layer of the multilayer film comprises an extremely pure raw material which is free from lubricants and contains no ionogenic components. It preferably has a residual ash content of less than about 50 ppm, a chlorine content of less than about 10 ppm and a content of organic neutralizing agents, in particular calcium stearate, of from about 0 to 0.01% by weight. This raw material is stabilized with a suitable stabilizer system in a manner such that it has an idealized thermal oxidation temperature (measured using a differential calorimeter at a heating rate of 20 K/min) in the range of from about 260 to 300° C., in particular in the range of from about 260 to 280° C. The raw material for the outer layer is likewise stabilized in such a manner that it has an idealized thermal oxidation temperature, measured by the same method, in the range of from about 240 to 300° C., especially in the range of from about 240 to 270° C. Stabilization of both raw materials is harmonized so that the film itself has an idealized thermal oxidation temperature in the range of from about 250 to 290° C., in particular in the range of from about 250 to 275° C.

Determination of the idealized thermal oxidation temperature is carried out in the following manner: 2 to 5 mg of the raw material or film to be examined are heated in a differential calorimeter at a heating rate of 20 K/min. Air is used as the purging gas and the outlet temperature is 295 K. The FIG. 1 shows the change in heat flow as the temperature rises. While this curve at first runs almost horizontally (baseline), these values increase sharply at a certain temperature due to oxidation (exothermal branch). The idealized thermal oxidation temperature is determined as shown in the FIG. 1 from the intersection of the straight line projection of the exothermal branch of the thermogram with the base line.

The film having this structure was found to have a high retention of dielectric loss factor over time, even at elevated temperatures. The breakdown voltage is also very high both to direct and alternating potentials and remains stable for a relatively long period of time, even at elevated temperatures. Contrary to expectations, it was found that despite the high level of stabilization necessary to obtain the thermal oxidation temperatures necessary, the dielectric loss factor was not unacceptably high, in particular when the raw materials used for both base layer and outer layer had an ash content of less than about 50 ppm, a chlorine content of less than about 10 ppm and a content of organic neutralizing agents such as calcium stearate of from about 0 to 0.01% by weight.

In one embodiment of the invention, the multilayer film has two outer layers (ABA structure). The raw material used for this purpose for the outer layers has a relatively low idealized thermal oxidation temperature, in particular in the range of from about 240 to 250° C., when it is expected that the electrically insulating film will come into contact with substances, in particular with impregnation fluids customary in foil capacitors, in which there is a risk of stabilizer extraction and an associated deterioration in the dielectrical characteristics.

If one of the two outer surfaces of the film is provided with a vapor-deposited metal layer, the multilayer film expediently only has one outer layer (AB structure), this outer layer being on the non-metallized side. The raw material for the outer layer has a relatively high idealized thermal oxidation temperature, in particular in the range of from about 255 to 270° C., when contact with substances which extract stabilizers is not expected and the film is required to have a good microscopic profile.

Stabilizers in this context are selected from classes of substances which include sterically hindered phenols, phosphites, thioethers, phosphonites or mixtures of these substances, where the first two categories of materials are especially preferred. If phenolic stabilizers are used, these are chosen so that they have a molecular weight expediently greater than about 300 g/mol, in particular greater than about 700 g/mol. An extensive list of stabilizers for polypropylene is given by T.J. Henman in the publication "World Index of Polyolefine Stabilizers", Kogan Page Ltd., London, 1982. In particular, suitable compounds are described in EP-A-0,222,296. They result in a better retention of dielectric loss factor and electrical breakdown voltage of the film over time, when it is used in a capacitor coil. The disclosure of these documents is incorporated by reference.

The multilayer film is made by coextruding melts of the polymers which form the layers through a film die, and the multilayer film obtained by coextrusion is allowed to solidify by cooling, and then is stretched lengthwise in the ratio of about 5:1 to 7:1 at a temperature of, for example, about 120 to 150° C. and is stretched in the transverse direction in the ratio of about 8:1 to 10:1 at a temperature of, for example, about 160 to 170° C. Finally the biaxially stretched film is thermoset at, for example, about 150 to 165° C. The process is carried out in such a way that its roughness $R_z$ is less than or equal to about 1.5 $\mu$m and is especially in the range of from about 0.07 to 0.5 $\mu$m, where the roughnesses of the two outer layers may be the same or different. Suitable roughnesses are also quoted in EP-A-0,222,296.

Not only polypropylene can be used for the propylene polymers but also polymer mixtures of polypropylene with other polyolefins, especially HDPE (high density polyethylene), LDPE (low density polyethylene), LLDPE (linear low density polyethylene) or poly-4-methyl-1-pentene, where the proportion of the other polyolefins is usually not above about 15% by weight, based on the total weight of the polymer mixture, or block copolymers of polypropylene, especially with ethylene, or random copolymers of polypropylene, especially with ethylene. In general in the copolymers, the proportion of comonomer present with propylene does not exceed about 10% by weight, based on the copolymer. As a rule the same propylene polymer is used for the outer layers as for the base layer.

Stabilization of the base and outer layer is regulated in accordance with the idealized thermal oxidation temperatures required, these temperatures determining the amount of stabilizer necessary, which will vary according to the type of stabilizer. It is not usual to exceed a stabilizer content of about 0.8% by weight in the multilayer film, while the stabilizer content of the outer layer is never greater than that of the base layer. In a preferred embodiment, the stabilizer content of the outer layer is significantly lower than that of the base layer, and in particular has a maximum value of only about 50% by weight of the proportion of stabilizer in the base layer.

The film produced according to the invention is used both for film foil capacitors made from metallized propylene film, preferably in capacitors for those applications in which a high retention of electrical and dielectrical characteristics over time is required, even at elevated temperatures.

The invention is described more fully in the following examples. The idealized thermal oxidation temperature of raw materials used in the examples is achieved by addition of 1,3,5-trimethyl-2,4,6-tris(3,5-di-tert-butyl-4-hydroxybenzyl)benzene (see the following formula) as stabilizer.

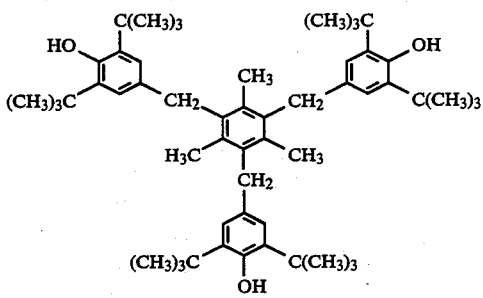

Table I shows the dependence of the idealized thermal oxidation temperature on the proportion of this stabilizer in the raw material. The stabilizer content is given in % by weight, based on the total weight of the raw material. This dependence is also shown in the diagram. Raw materials with this stabilizer were used in the following examples. The films produced all have the ABA structure. The percentages quoted are percent by weight.

TABLE I

| Sample No. | Stabilizer content (%) | Idealized thermal oxidation temperature (°C.) |
|---|---|---|
| 1 | 0.05 | 238 |
| 2 | 0.10 | 245 |
| 3 | 0.15 | 251 |
| 4 | 0.20 | 255 |
| 5 | 0.25 | 257 |
| 6 | 0.30 | 261 |
| 7 | 0.50 | 270 |

EXAMPLE 1

A polypropylene raw material for the base layer having an idealized thermal oxidation temperature of approximately 261° C. and a polypropylene raw material for the outer layer also having an idealized thermal oxidation temperature of approximately 261° C. were used to produce a biaxially oriented coextruded film. The chlorine content of both raw materials was 4 ppm, and the calcium stearate content was less than 0.01%. In each case, the n-heptane-soluble fraction was 4%. The raw materials for the base and outer layers were coextruded through a film die, and, after cooling, the film was stretched firstly lengthwise and then in the transverse direction and finally thermoset. The three layered film obtained in this way had a total thickness of 10 μm, comprised of an 8 μm thick base layer, and outer layers each 1 μm thick. Corona pretreatment was not carried out.

The idealized thermal oxidation temperature of the multilayer film was 259° C.

EXAMPLE 2

A biaxially oriented coextruded double-layered film was produced in a manner analogous to Example 1. The raw material used for the base layer had an idealized thermal oxidation temperature of approximately 261° C., and the raw material for the outer layer had an idealized thermal oxidation temperature of approximately 245° C. The chlorine content of both raw materials was 4 ppm, and the calcium stearate content was less than 0.01%. The idealized thermal oxidation temperature of the film was 258° C.

COMPARATIVE EXAMPLE 1

A biaxially oriented coextruded double-layered film was produced in a manner analogous to Example 1. The raw materials used for both the base layer and the outer layer, comprised polypropylene and had an idealized thermal oxidation temperature of approximately 261° C. The chlorine content was 40 ppm, and the calcium stearate content was 0.1%. The idealized thermal oxidation temperature of the film was 259° C.

COMPARATIVE EXAMPLE 2

A biaxially oriented coextruded double-layered film was produced in a manner analogous to Example 1. The raw material used for the base layer had an idealized thermal oxidation temperature of 261° C., while the raw material used for the outer layer had an idealized thermal oxidation temperature of approximately 238° C. Both comprised polypropylene. The chlorine content of both raw materials was 40 ppm, and the calcium stearate content was 0.1%. The idealized thermal oxidation temperature of the film was 255° C.

COMPARATIVE EXAMPLE 3

A biaxially oriented coextruded double-layered film was produced in a manner analogous to Example 1. Both the raw material used for the base layer and the raw material used for the outer layer, comprised polypropylene and had an idealized thermal oxidation temperature of approximately 238° C. The chlorine content of both raw materials was 4 ppm, and the calcium stearate content was less than 0.01%. The idealized thermal oxidation temperature of the film was 228° C.

COMPARATIVE EXAMPLE 4

A biaxially oriented coextruded double-layered film was produced in a manner analogous to Example 1. The raw material used for the base layer had an idealized thermal oxidation temperature of approximately 238° C., while the raw material used for the outer layer had an idealized thermal oxidation temperature of approximately 245° C. The chlorine content of both raw materials was 4 ppm, and the calcium stearate content was 0.01%. The idealized thermal oxidation temperature of the film was 230° C.

The electrical characteristics of each film are compared in Table II.

The meaning of the symbols is as follows:

| DC | dielectric constant, measured at 10 kHz, |
| tan δ | dielectric loss factor, measured at 10 kHz, |
| R | resistivity in the units ohm.cm, |
| $E_{D,O}$ | DC voltage strength without storage, units kV/mm, |
| $E_{D,1000}$ | DC voltage strength after 1000 hours storage at 120° C., units kV/mm, |
| $\Delta E_D$ | change in DC voltage strength in percent. |

The measurements of dielectric constant, tan δ (measured at 10kHz) and resistivity were carried out at 120° C., and the measurement of breakdown voltage at 25° C.

It can be seen from Table II that Comparative Examples 1 and 2 produce a dielectric loss factor which is above the upper limit of acceptability for capacitor applications, namely 2.0 × 10⁻⁴. The dielectrical characteristics and the breakdown voltage in Comparative Examples 3 and 4 are admittedly excellent, but deteriorate quickly after storage at elevated temperatures.

In contrast, Examples 1 and 2 according to the invention have good values both before and after storage at 120° C.

The multilayer film described above is used as a dielectric in an electrical film capacitor, which generally comprises two multilayer films of this kind and two metal foils, where the latter serve as electrodes. Together, the foils and films make up the capacitor coil.

TABLE II

| | Electrical characterisitcs of films produced | | | | | |
|---|---|---|---|---|---|---|
| | DC | tanδ | R | $E_{D,0}$ | $E_{D,1000}$ | $\Delta E_d$ |
| Example 1 | 2.23 | 1.4 × 10⁻⁴ | 1.5 × 10¹⁶ | 713 | 650 | 8.8 |
| Example 2 | 2.23 | 1.1 × 10⁻⁴ | 5.7 × 10¹⁵ | 688 | 652 | 5.2 |
| Comparative Example 1 | 2.23 | 3.7 × 10⁻⁴ | 2.3 × 10¹⁶ | 544 | 530 | 2.5 |
| Comparative Example 2 | 2.23 | 4.0 × 10⁻⁴ | 5.6 × 10¹⁵ | 618 | 543 | 10.5 |
| Comparative Example 3 | 2.24 | 0.9 × 10⁻⁴ | 4.5 × 10¹⁵ | 662 | 491 | 25.8 |
| Comparative Example 4 | 2.23 | 0.9 × 10⁻⁴ | 6.0 × 10¹⁵ | 705 | 521 | 26.0 |

What is claimed is:

1. A coextruded, biaxially oriented multilayer film comprising:
   (a) a base layer comprising an extremely pure raw material which comprises at least one propylene polymer and at least one stabilizer for propylene polymers, and
   (b) an outer layer on at least one side of said base layer, comprising a raw material which comprises at least one propylene polymer and at least one stabilizer for propylene polymers,
   wherein said base layer raw material has an idealized thermal oxidation temperature of between about 260 and 300° C., said outer layer raw material has an idealized thermal oxidation temperature of between about 240 and 300° C., and said multilayer film as a whole has an idealized thermal oxidation temperature of between about 250 and 290° C., and wherein said raw materials further comprise from 0 to about 100 ppm of at least one organic neutralizing agent.

2. A multilayer film as claimed in claim 1, wherein said base layer raw material has an idealized thermal oxidation temperature of between about 260 and 280° C.

3. A multilayer film as claimed in claim 1, wherein said outer layer raw material has an idealized thermal oxidation temperature of between about 240 and 270° C.

4. A multilayer film as claimed in claim 1, wherein said film as a whole has an idealized thermal oxidation temperature of between about 250 and 275° C.

5. A multilayer film as claimed in claim 1, wherein said film has an outer layer on each side of the base layer.

6. A multilayer film as claimed in claim 1, wherein said neutralizing agent comprises calcium stearate.

7. A multilayer film as claimed in claim 1, wherein the stabilizer content of said outer layer material is equal to the stabilizer content of said base layer material.

8. A multilayer film as claimed in claim 1, wherein the stabilizer content of said outer layer material is less than the stabilizer content of said base layer material.

9. A multilayer film as claimed in claim 8, wherein the stabilizer content of said outer layer material is less than about 50% by weight of the stabilizer content of said base layer material.

10. A multilayer film as claimed in claim 1, wherein said base and outer layer materials comprise extremely pure polypropylene.

11. A multilayer film as claimed in claim 1, wherein said base and outer layer materials comprise a polymer mixture of polypropylene with at least one polyolefin.

12. A multilayer film as claimed in claim 11, wherein said polyolefin comprises HDPE, LDPE, LLDPE or poly-4-methyl-1-pentene and the proportion of said polyolefin does not exceed about 15% by weight based on the total weight of the polymer mixture.

13. A multilayer film as claimed in claim 1, wherein said base and outer layer materials comprise a block copolymer comprising polypropylene and a comonomer.

14. A multilayer film as claimed in claim 13, wherein said comonomer comprises ethylene and the proportion of said comonomer does not exceed about 10% by weight based on the total weight of the copolymer.

15. A multilayer film as claimed in claim 1, wherein said base and outer layer materials comprise a random copolymer comprising polypropylene and a comonomer.

16. A multilayer film as claimed in claim 15, wherein said comonomer comprises ethylene and the proportion of said comonomer does not exceed about 10% by weight based on the total weight of the copolymer.

17. A multilayer film as claimed in claim 1, wherein said stabilizer comprises a thioether, a phosphonite, a phosphite, or a sterically hindered phenol.

18. A multilayer film as claimed in claim 17, wherein said sterically hindered phenol has a molecular weight greater than about 300 g/mol.

19. A multilayer film as claimed in claim 18, wherein said sterically hindered phenol has a molecular weight greater than about 700 g/mol.

20. A multilayer film as claimed in claim 1, wherein the residual ash content is less than about 50 ppm and the chlorine content is less than about 10 ppm.

21. A multilayer film as claimed in claim 1, wherein the total thickness of the multilayer film is between about 3 and 30 μm.

22. A multilayer film as claimed in claim 21, wherein each outer layer has a thickness of from 0.3 to 2.0 μm.

23. A multilayer film as claimed in claim 22, wherein each layer is of the same thickness.

24. A multilayer film as claimed in claim 22, wherein each outer layer surface has a roughness $R_z$ less than or equal to about 1.5 μm.

25. A multilayer film as claimed in claim 1, which further comprises an outer metal layer.

26. An electrical film capacitor, comprising two metallic electrode layers separated by an electrically insulating film as claimed in claim 1.

* * * * *